US010889699B2

(12) United States Patent
Musio et al.

(10) Patent No.: US 10,889,699 B2
(45) Date of Patent: Jan. 12, 2021

(54) TETRAFLUOROETHYLENE COPOLYMERS

(71) Applicant: SOLVAY SPECIALTY POLYMERS ITALY S.P.A., Bollate (IT)

(72) Inventors: Stefana Musio, Alessandria (IT);
Valeriy Kapelyushko, Alessandria (IT);
Marco Malvasi, Novi Liqure (IT);
Stefano Vincenzo Radice, Meda (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 14/409,086

(22) PCT Filed: Jun. 13, 2013

(86) PCT No.: PCT/EP2013/062257
§ 371 (c)(1),
(2) Date: Dec. 18, 2014

(87) PCT Pub. No.: WO2013/189826
PCT Pub. Date: Dec. 27, 2013

(65) Prior Publication Data
US 2015/0197620 A1 Jul. 16, 2015

(30) Foreign Application Priority Data

Jun. 20, 2012 (EP) .................... 12172832

(51) Int. Cl.
*C08K 5/1565* (2006.01)
*C08F 214/26* (2006.01)
*C08F 14/26* (2006.01)

(52) U.S. Cl.
CPC ............ *C08K 5/1565* (2013.01); *C08F 14/26* (2013.01); *C08F 214/26* (2013.01)

(58) Field of Classification Search
CPC ....... C08K 5/1565; C08F 14/26; C08F 214/26

USPC ......................................... 524/754
See application file for complete search history.

(56) References Cited

U.S. PATENT DOCUMENTS

| 4,098,875 | A | 7/1978 | Ishii et al. | |
|---|---|---|---|---|
| 5,285,002 | A | 2/1994 | Grootaert | |
| 2005/0010007 | A1* | 1/2005 | Tsuji | C08J 3/12 526/250 |
| 2011/0160415 | A1* | 6/2011 | Marchionni | C07D 317/42 526/204 |
| 2012/0252970 | A1* | 10/2012 | Apostolo | C08F 14/18 524/752 |

FOREIGN PATENT DOCUMENTS

| EP | 2143738 A1 | 1/2010 |
|---|---|---|
| WO | 2010003929 A1 | 1/2010 |
| WO | 2011073344 A1 | 6/2011 |

OTHER PUBLICATIONS

Moynihan, R.E., "The Molecular Structure of Perfluorocarbon Polymers. Infrared Studies on Polytetrafluoroethylene", J. Am. Chem. Soc., 1959, vol. 81, pp. 1045-1050-ACS.

* cited by examiner

*Primary Examiner* — Kelechi C Egwim
(74) *Attorney, Agent, or Firm* — Osha Bergman Watanabe & Burton LLP

(57) ABSTRACT

The invention pertains to a tetrafluoroethylene (TFE) copolymer comprising recurring units derived from at least one per(halo)fluoroolefin different from TFE [monomer (F)] [monomer (F)], in an amount of 0.005 to 0.250% moles, with respect to the total moles of the copolymer, wherein a particular relation between monomer content and amorphous index is satisfied, and to a process for its manufacture by emulsion polymerization in the presence of certain cyclic surfactants.

16 Claims, 1 Drawing Sheet

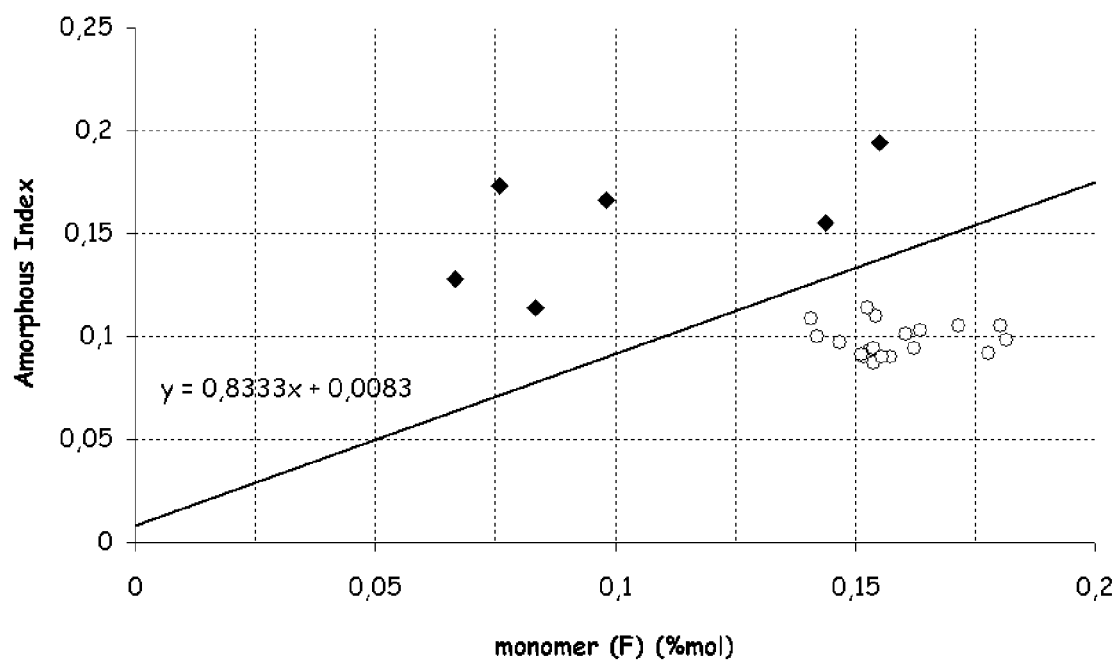

TETRAFLUOROETHYLENE COPOLYMERS

CROSS-REFERENCE TO RELATED APPLICATION

This application is a U.S. national stage entry under 35 U.S.C. § 371 of International Application No. PCT/EP2013/062257 filed Jun. 13, 2013, which claims priority to European application No. EP 12172832.3 filed on Jun. 20, 2012, the whole content of this application being incorporated herein by reference for all purposes. The entire contents of these applications are explicitly incorporated herein by this reference.

TECHNICAL FIELD

The invention pertains to certain tetrafluoroethylene copolymers, to a process for their manufacture and to their use for manufacturing shaped articles via different techniques.

BACKGROUND ART

Polytetrafluoroethylene (PTFE) can be modified while maintaining its inherent non-melt moldability by copolymerizing tetrafluoroethylene (hereinafter referred to as "TFE") with at least one other fluorine-containing monomer in an amount of not larger than about 2% by weight. Such a copolymer is known as a "modified PTFE" and is distinguished from a melt moldable TFE copolymer. In the art, thus, the term "modified PTFE" is generally intended to denote a TFE polymer modified with a small amount of a comonomer as described above. The particular attention which has been drawn by modified PTFE is due to the fact that this material has physical properties and/or moldability which are not found in "pure" PTFE.

As the modifier, copolymerizable monomers including per(halo)fluoroolefins different from TFE, e.g. tetrafluoroethylene, chlorotrifluoroethylene, perfluoroalkylvinylethers, perfluorodioxoles have been used for manufacturing modified PTFE. The introduction of the modifier to PTFE is known to reduce the crystallinity of the polymer, to suppress the inherent fibrillation property of the PTFE and to improve several other valuable mechanical and processing properties over those of native PTFE.

A useful measure of the decrease of crystallinity in modified PTFE is provided by the Amorphous Index, as described notably in MOYNIHAN, R. E. The Molecular Structure of Perfluorocarbon Polymers. Infrared Studies on Polytetrafluoroethylene. *J. Am. Chem. Soc.* 1959, vol. 81, p. 1045-1050. The ratio between the intensity of a IR absorption band centred at about 778 cm$^{-1}$ and the intensity of another IR absorption band centred at about 2367 cm$^{-1}$ has been shown to suitably and reliably correlates to the fraction of amorphous phase in the modified PTFE materials. In other terms, this IR intensity ratio has been found to be directly proportional to the polymer chain conformational disorder content.

Nevertheless, the introduction of modifying comonomers, in particular perfluoroolefins different from TFE, in the TFE polymer chains significantly contributes to economics (e.g. variable costs) of the modified PTFE itself, because of the use of expensive modifying monomers, whose price largely exceeds that of tetrafluoroethylene.

There's thus a continuous search in this domain for modified PTFE which possess highest possible amorphous fraction with the minimum required amount of comonomer.

Further, there's a continuous need for a process enabling manufacture of said modified PTFE, having optimized consumption of the comonomer to be used with TFE, so as to achieve a target amorphous fraction.

BRIEF DESCRIPTION OF DRAWINGS

FIG. 1 is a plot of amorphous index values, as determined by IR spectrometry, as a function of molar concentration of monomer (F), for TFE copolymers of the invention (black solid squares ◆) obtained by emulsion polymerization in the presence of surfactant (FS) and for comparative TFE copolymers with hexafluoropropylene (white circles ○) obtained by emulsion polymerization in the presence of ammonium perfluorooctanoate.

SUMMARY OF INVENTION

The applicant has now found that it is possible to incorporate the perfluoroolefin in modified PTFE structures by the use of a particular emulsifier, so as to access a new class of modified PTFE materials which, by virtue of their peculiar microstructure, as a fingerprint of the emulsifier used possesses increased amorphous fraction content at given comonomer content.

Thus, in a first aspect, this invention pertains to a process for the manufacture of a tetrafluoroethylene (TFE) copolymer [polymer (F)] comprising recurring units derived from at least one per(halo)fluoroolefin different from TFE [monomer (F)], in an amount of 0.01 to 0.250% moles, with respect to the total moles of the copolymer, said process comprising emulsion polymerizing TFE and said at least one monomer (F) in an aqueous medium comprising at least one surfactant [surfactant (FS)] complying with formula (IB):

(IB)

wherein:
$X_1$, $X_2$ and $X_3$, equal to or different from each other, are independently selected from H, F and $C_1$-$C_6$ (per)fluoroalkyl groups, optionally comprising one or more catenary or non-catenary oxygen atoms,
$R_F$ represents a divalent perfluorinated $C_1$-$C_3$ bridging group,
L represents a bond or a divalent group and
Y represents an anionic functionality, preferably selected from the group consisting of:

(1')

(2')

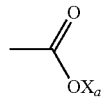
(3')

wherein $X_a$ is a hydrogen atom, a monovalent metal, preferably an alkaline metal, or an ammonium group of formula —N(R′$_n$)$_4$, wherein R′$_n$, equal or different at each occurrence, is a hydrogen atom or a $C_1$-$C_6$ hydrocarbon group, preferably an alkyl group.

In another aspect, the invention pertains to a tetrafluoroethylene (TFE) copolymer comprising recurring units derived from at least one per(halo)fluoroolefin different from TFE [monomer (F)], in an amount of 0.01 to 0.250% moles, with respect to the total moles of the copolymer, wherein the following inequality is satisfied:

$$A.I. > 0.0083 + 0.8333 \times [M]$$

wherein:
- A.I. is the Amorphous Index, defined as the ratio between intensity of the waveband centered at about 778 cm$^{-1}$ and intensity of the waveband centered at about 2367 cm$^{-1}$, as determined by infrared spectroscopy on a specimen of the TFE copolymer,
- [M] is the % moles of recurring units derived from said monomer (F).

The Applicant has surprisingly found that when polymerizing TFE in the presence of a reduced amount of monomer (F), as above detailed, in the presence of surfactant (FS), the incorporation of said monomer (F) in the modified PTFE polymer is such that a new and advantageous compromise between monomer content and amorphous index can be obtained, so as to maximize the modifying behaviour of the monomer and thus reducing its consumption, while keeping same amorphous index, and thus same advantageous properties.

According to a first variant of the invention, the surfactant (FS) preferably complies with formula (IIB) here below:

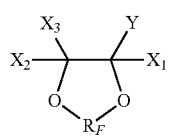
(IIB)

wherein $X_1$, $X_2$, $X_3$, $R_F$ and Y have the same meaning as defined above. The surfactant (FS) of formula (IIB) preferably complies with formula (IIIB) here below:

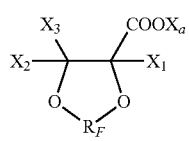
(IIIB)

wherein $X_1$, $X_2$, $X_3$, $R_F$ and $X_a$ have the same meaning as defined above. The surfactant (FS) of formula (IIIB) can comply with formula (IVB) here below:

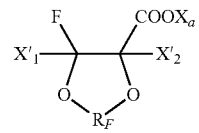
(IVB)

wherein X′$_1$ and X′$_2$, equal to or different from each other, are independently a fluorine atom, a —R′$_f$ group or a —OR′$_f$ group, wherein R′$_f$ is a $C_1$-$C_3$ perfluoroalkyl group, preferably with the proviso that at least one of X′$_1$ and X′$_2$ are different from fluorine, and $R_F$ and $X_a$ have the same meanings as defined above. Compounds of formula (IV) as described above can be notably manufactured as detailed in EP 2143738 A (SOLVAY SOLEXIS SPA) Jan. 13, 2010 and WO 2010/003929 (SOLVAY SOLEXIS SPA) Jan. 14, 2010. The surfactant (FS) having formula (IVB) of the first variant preferably complies with formula (VB) here below:

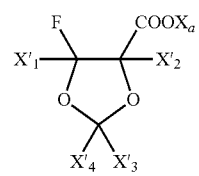
(VB)

wherein X′$_1$, X′$_2$, X′$_3$, X′$_4$, equal to or different each other, are independently a fluorine atom, a —R′$_f$ group or a —OR′$_f$ group, wherein R′$_f$ is a $C_1$-$C_3$ perfluoroalkyl group.

Non limitative examples of surfactants (FS) having formula (VB) as described above include, notably, the following:

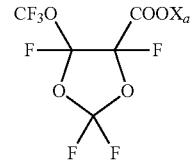
(VB-a)

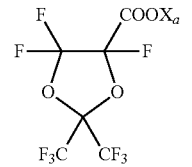
(VB-b)

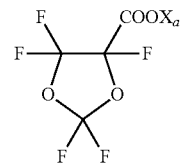
(VB-c)

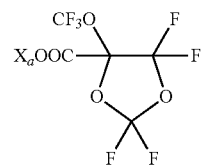
(VB-d)

As an alternative, surfactant (FS) of formula (IIIB) can comply with formula (VIB) here below:

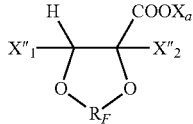
(VIB)

wherein X"$_1$ and X"$_2$, equal to or different from each other, are independently a fluorine atom, a —R'$_f$ group or a —OR'$_f$ group, wherein R'$_f$ is a C$_1$-C$_3$ perfluoroalkyl group, and R$_F$ and X$_a$ have the same meanings as defined above. Compounds of formula (VIB) as described above can be notably manufactured as detailed in EP 2143738 A (SOLVAY SOLEXIS SPA) Jan. 13, 2010 and WO 2010/003929 (SOLVAY SOLEXIS SPA) Jan. 14, 2010.

The surfactant (FS) having formula (VIB) preferably complies with formula (VIIB) here below:

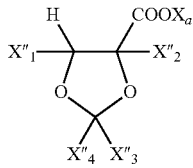
(VIIB)

wherein X"$_1$, X"$_2$, X"$_3$, X"$_4$, equal to or different each other, are independently a fluorine atom, a —R'$_f$ group or a —OR'$_f$ group, wherein R'$_f$ is a C$_1$-C$_3$ perfluoroalkyl group.

Non limitative examples of surfactants (FS) having formula (VIIB) as described above include, notably, the following:

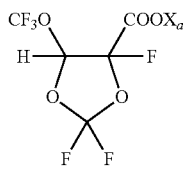
(VIIB-a)

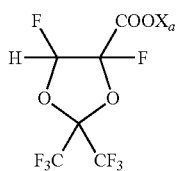
(VIIB-b)

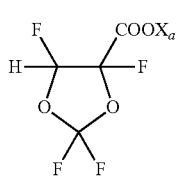
(VIIB-c)

According to a second variant of the invention, the surfactant (FS) complies with formula (VIIIB) here below:

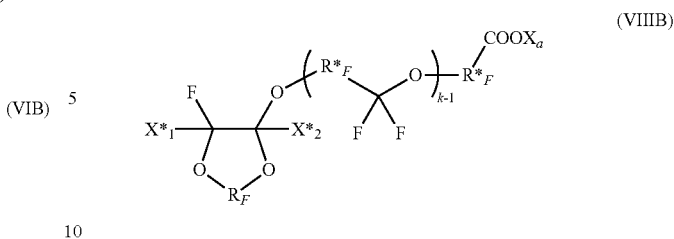
(VIIIB)

wherein R$_F$ and X$_a$ have the same meanings as defined above, X*$_1$ and X*$_2$, equal to or different from each other, are independently a fluorine atom, a —R'$_f$ group or a —OR'$_f$ group, wherein R'$_f$ is a C$_1$-C$_3$ perfluoroalkyl group, R*$_F$ is a divalent fluorinated group and k is an integer from 1 to 3. Compounds of formula (VIIIB) as described above can be notably manufactured as detailed in EP 2143738 A (SOLVAY SOLEXIS SPA) Jan. 13, 2010 and WO 2010/003929 (SOLVAY SOLEXIS SPA) Jan. 14, 2010.

The surfactant (FS) of formula (VIIIB) preferably complies with formula (IXB) here below:

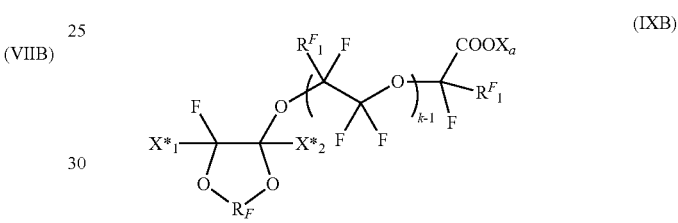
(IXB)

wherein R$_F$ and X$_a$ have the same meanings as defined above, X*$_1$ and X*$_2$, equal to or different from each other, are independently a fluorine atom, a —R'$_f$ group or a —OR'$_f$ group, wherein R'$_f$ is a C$_1$-C$_3$ perfluoroalkyl group, R$^F_1$ is a fluorine atom or a —CF$_3$ group and k is an integer from 1 to 3.

Among these compounds, surfactants (FS) having formulae (X) and (X$_1$) here below:

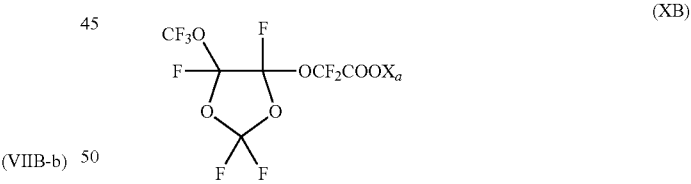
(XB)

(XIB)

wherein X$_a$ has the meaning as defined above, have been found particularly useful in the process of the invention.

In the process of the invention, one or more surfactant (FS) of formula (IB) are used.

The amount of surfactant (FS) used may vary depending on desired properties such as amount of solids, particle size etc. . . . Generally the amount of surfactant (FS) will be between 0.001% by weight and 5% by weight, based on the weight of water in the polymerization. A practical range is between 0.05% by weight and 1% by weight, based on the weight of water in the polymerization.

While the polymerization is generally initiated in the presence of the surfactant (FS), it is not excluded to add further surfactant (FS) during the polymerization, although such addition will generally not be necessary.

Nevertheless, it may be desirable to add certain monomer to the polymerization in the form of an aqueous emulsion. For example, fluorinated monomers and in particular monomers (F) which are liquid under the polymerization conditions may be advantageously added in the form of an aqueous emulsion. Such emulsion of such monomers (F) is preferably prepared using surfactant (FS) as an emulsifier.

One or more than one monomer (F) can be used in the process of the invention.

As said, monomer (F) is a per(halo)fluoroolefin, that is to say an ethylenically insaturated fluorinated olefin, free from hydrogen atoms and possibly comprising one or more than one halogen atoms different from fluorine, in particular chlorine or bromine.

Preferably monomer (F) is a $C_3$-$C_8$ perfluoroolefins, and most preferably monomer (F) is hexafluoropropylene (HFP).

Polymer (F), which is the result of the process of the invention, comprises recurring units derived from monomer (F) in an amount of 0.005 to 0.250% by moles, with respect to the total moles of recurring units. Generally, polymer (F) comprises recurring units derived from monomer (F) in an amount of at least 0.01% by moles, preferably at least 0.05% by moles and/or in an amount of at most 0.200% by moles, preferably at most 0.175% by moles.

Particularly good results have been obtained for polymers (F) comprising from 0.05 to 0.175% by moles of recurring units derived from monomer (F), with respect to the total moles of recurring units.

Polymer (F), which is the result of the process of the invention, comprises recurring units derived from monomer (F) in an amount of 0.005 to 0.250% by moles, with respect to the total moles of recurring units. Generally, polymer (F) comprises recurring units derived from monomer (F) in an amount of at least 0.01% by moles, preferably at least 0.05% by moles and/or in an amount of at most 0.200% by moles, preferably at most 0.175% by moles.

Particularly good results have been obtained for polymers (F) comprising from 0.05 to 0.175% by moles of recurring units derived from monomer (F), with respect to the total moles of recurring units.

It is not excluded that the polymer (F) might comprise recurring units derived from one or more than one additional monomer [monomer (A)] different from TFE and monomer (F); in case such additional recurring units are present, the amount of recurring units derived from monomer (A) will be comprised in the range of 0.001 to 0.005% moles, with respect to the total moles of the recurring units of the copolymer. Amounts of monomer (A) exceeding this range might influence otherwise the behaviour of the polymer (F).

Monomer (A) can be selected from the group consisting of:
fluorodioxoles, of formula:

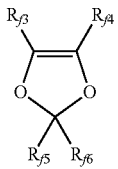

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$;
perfluoroalkyl(oxy)vinylether of formula $CF_2$=CF—O—$R_f$, wherein $R_f$ is a $C_1$-$C_6$ perfluoroalkyl radical possibly comprising one or more ethereal oxygen atoms, preferably selected from the group consisting of:
perfluoroalkylvinylether of formula $CF_2$=CF—O—$R'_f$, wherein $R'_f$ is a $C_1$-$C_3$ perfluoroalkyl radical selected from the group consisting of —$CF_3$ (Perfluoromethylvinylether), —$CF_2CF_3$ (perfluoroethylvinylether), —$CF_2CF_2CF_3$ (perfluoropropylvinylether);
perfluoromethoxyalkylvinylether of formula $CF_2$=CF—O—$CF_2$—O—$R''_f$, wherein $R''_f$ is a $C_1$-$C_3$ perfluoro (oxy)alkyl radical, preferably selected from the group consisting of —$CF_3$, —$CF_2CF_3$, —$CF_2CF_2$—$OCF_3$;
mixtures thereof.

It is nevertheless generally understood that preferred embodiments are those wherein the polymer (F) consists essentially of recurring units derived from TFE and from monomer (F), as above detailed. Impurities, chain ends, defects might still be present, without their presence substantially impacting properties of the TFE copolymer.

Best results have been obtained when polymer (F) consisted essentially of recurring units derived from TFE and from 0.05 to 0.175% by moles (with respect to the total moles of recurring units) of recurring units derived from hexafluoropropylene.

The aqueous emulsion polymerization may be carried out at a temperature between 10 to 150° C., preferably 20° C. to 110° C. Pressure is typically between 2 and 30 bar, in particular 5 to 20 bar.

The reaction temperature may be varied during the polymerization e.g. for influencing the molecular weight distribution, i.e., to obtain a broad molecular weight distribution or to obtain a bimodal or multimodal molecular weight distribution.

The pH of the aqueous medium of the polymerization may be in the range of pH 2-11, preferably 3-10, most preferably 4-10.

The emulsion polymerization in aqueous medium is typically initiated by an initiator including any of the initiators known for initiating a free radical polymerization of fluorinated monomers. Suitable initiators include peroxides and azo compounds and redox based initiators. Specific examples of peroxide initiators include, hydrogen peroxide, sodium or barium peroxide, diacylperoxides such as diacetylperoxide, disuccinyl peroxide, dipropionylperoxide, dibutyrylperoxide, dibenzoylperoxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic include for example ammonium-, alkali- or alkaliearth-salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit) or fluoroalkyl sulfinates, e.g. as disclosed in U.S. Pat. No. 5,285,002 (MINNESOTA MINING & MFG) Feb. 8, 1994. The reducing agent typically reduces the half-life time of the initiator. Additionally, a metal salt catalyst such as for example copper, iron or silver salts may be added.

The amount of initiator may be between 0.01% by weight and 1% by weight, based on the amount of polymer (F) to be produced. In one embodiment, the amount of initiator is between 0.05 and 0.5% by weight. In another embodiment, the amount may be between 0.05 and 0.3% by weight.

The aqueous emulsion polymerization can be carried out in the presence of other materials, such as notably buffers and, if desired, complex-formers or chain-transfer agents.

Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$ and hydrofluorocarbon compounds such as $CH_2F$—$CF_3$ (R134a). Additionally esters like ethylacetate, malonic esters can be effective as chain transfer agent in the process of the invention.

The aqueous emulsion polymerization process of the invention results in a dispersion of the polymer (F) in water comprising the surfactant (FS), as above detailed. Generally the amount of solids of the polymer (F) in the dispersion directly resulting from the polymerization will vary between 3% by weight and about 40% by weight depending on the polymerization conditions. A typical range is between 5 and 30% by weight, for example between 10 and 25% by weight.

The particle size (volume average diameter) of the polymer (F), as obtained from the process of the invention, is typically between 40 nm and 400 nm with a typical particle size being between 60 nm and about 350 nm. The total amount of surfactant (FS) in the resulting dispersion is typically between 0.001 and 5% by weight based on the amount of polymer (F) solids in the dispersion. A typical amount may be from 0.01 to 2% by weight or from 0.02 to 1% by weight, based on the amount of polymer (F) solids in the dispersion.

The polymer (F) may be isolated from the dispersion by coagulation if a polymer in solid form is desired. Also, depending on the requirements of the application in which the polymer (F) is to be used, the polymer (F) may be post-fluorinated so as to convert any thermally unstable end groups into stable $CF_3$— end groups.

For coating applications, an aqueous dispersion of the polymer (F) might be desired and hence the polymer (F) will not need to be separated or coagulated from the dispersion. To obtain a polymer (F) dispersion suitable for use in coating applications such as for example in the impregnation of fabrics or in the coating of metal substrates to make for example cookware, it will generally be desired to add further stabilizing surfactants and/or to further increase the polymer (F) solids. For example, non-ionic stabilizing surfactants may be added to the polymer (F) dispersion. Typically these will be added thereto in an amount of 1 to 12% by weight based on polymer (F). Examples of non-ionic surfactants that may be added include $R^1$—O—$[CH_2CH_2O]_n$—$[R^2O]_m$—$R^3$ (NS) wherein $R^1$ represents an aromatic or aliphatic hydrocarbon group having from 6 to 18 carbon atoms, $R^2$ represents an alkylene having 3 carbon atoms, $R^3$ represents hydrogen or a $C_{1-3}$ alkyl group, n has a value of 0 to 40, m has a value of 0 to 40 and the sum of n+m being at least 2. It will be understood that in the above formula (NS), the units indexed by n and m may appear as blocks or they may be present in an alternating or random configuration.

Examples of non-ionic surfactants according to formula (VI) above include alkylphenol oxy ethylates such as ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8. Still further examples include those in which $R^1$ in the above formula (NS) represents an alkyl group of 4 to 20 carbon atoms, m is 0 and $R^3$ is hydrogen. An example thereof includes isotridecanol ethoxylated with about 8 ethoxy groups and which is commercially available as GENAPOL® X080 from Clariant GmbH. Non-ionic surfactants according to formula (NS) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80.

The amount of polymer (F) in the dispersion may be up-concentrated as needed or desired to an amount between 30 and 70% by weight. Any of the known up-concentration techniques may be used including ultrafiltration and thermal up-concentration.

As said, another aspect of the invention pertains to a tetrafluoroethylene (TFE) copolymer comprising recurring units derived from at least one per(halo)fluoroolefin different from TFE [monomer (F)], in an amount of 0.01 to 0.250% moles, with respect to the total moles of the copolymer, wherein the following inequality is satisfied:

$$A.I. > 0.0083 + 0.8333 \times [M]$$

wherein:
A.I. is the Amorphous Index, defined as the ratio between intensity of the waveband centered at about 778 $cm^{-1}$ and intensity of the waveband centered at about 2367 $cm^{-1}$, as determined by infrared spectroscopy on a specimen of the TFE copolymer,
[M] is the % moles of recurring units derived from said monomer (F).

The TFE copolymer of the invention can be manufactured using the process as above detailed.

All features detailed herein above with reference to polymer (F) thus characterize preferred embodiments of the TFE copolymer of the invention.

Still another aspect of the invention pertains to a method for manufacturing shaped articles comprising using the TFE copolymer of the invention as above detailed.

Different processing techniques can be used in the method above mentioned.

According to certain embodiments, said method comprises extruding the TFE copolymer of the invention in combination with a volatile liquid. This technique is known as 'paste extrusion' technique. The TFE copolymer of the invention is particularly suitable for being processed according to this technique.

Should the disclosure of any patents, patent applications, and publications which are incorporated herein by reference conflict with the description of the present application to the extent that it may render a term unclear, the present description shall take precedence.

The invention will be now explained in more detail with reference to the following examples, whose purpose is merely illustrative and not intended to limit the scope of the invention.

Determination of Amorphous Index

A compressed tablet of polymer (F) powder, made in a press under about 10 tons pressure, is submitted to FT-IR analysis using a spectrophotometer FT-IR Nicolet Impact 410, having a spectral range of 4000 to 400 cm$^{-1}$.

Optical density or intensity of the absorption band centred on about 773 cm$^{-1}$, and attributed to conformational chain segments in configuration other than the helicoidally arranged crystalline chain 15/7, is determined and normalized over the optical density of the complex bad centred on 2365 cm$^{-1}$, related to harmonic bands and combinations of stretching of C—F and C—C bonds.

The amorphous index (A.I.), as an expression of conformational disorder, is thus determined as follow:

A.I.=(OD$_{773}$)/(OD$_{2365}$).

Determination of Molar Content of Hexafluoropropylene (HFP) in Polymer (F)

Content of hexafluoropropylene in the polymer is determined using a spectrophotometer FT-IR Nicolet Impact 410, having a spectral range of 4000 to 400 cm$^{-1}$.

A powder specimen of about 100 to 150 mg is introduced in a press and submitted to pressure (10 tons) for obtaining a tablet.

A FT-IR spectrum is then recorded and the region between 950 and 1050 cm$^{-1}$ is considered, wherein optical density of the absorption band due to the normal vibration mode of the —CF$_3$ group of the HFP recurring unit, centered on about 994 cm$^{-1}$, is determined and normalized over the absorption band due to the normal vibration mode of the TFE recurring units, centered on about 936 cm$^{-1}$. By appropriate computations based on suitable regression curves, the weight content and molar content of PPVE in the polymer is determined.

Determination of Rheometric Pressure

Rheometer extrusion pressure at reduction ratio 400:1 was determined according to ASTM D 4895. This method is intended to measure the properties of modified PTFE powders in the 'paste extrusion' conditions, i.e. when extruded as a blend with a volatile liquid, as prescribed in the standard. Determinations have been carried out at a reduction ratio of 1600:1; the reduction ratio (RR) is the ratio of a cross sectional area (S) of a cylinder in which the powder to be extruded is filled to a cross sectional area (s) of the die outlet (S/s). In this technique, in order to improve productivity, tendency is to increase the RR as much as possible; nevertheless when RR is increased, the extrusion pressure raises, and the extruded molding might develop defects. Comparing extrusion performances at given RR thus enable comparing easiness of processing, the lower the extrusion pressure, the better the processability performances, being understood that extrusion pressures below 75 MPa at RR of 1600:1, as indicated in ASTM D4895, Table 2, are considered totally satisfactory.

General Polymerization Procedure

A polymerization reactor with a total volume of 90 litres equipped with an impeller agitator was charged with 52 litres deionized water. The oxygen free reactor was heated up to 68° C. and the agitation system was set to 48 rpm. The reactor was charged with 1 kg of paraffin wax, 155 g of a cyclic surfactant of formula:

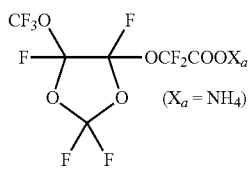

in water solution, 40 g of hexafluoropropene (HFP) and with TFE to a pressure of 20 bar.

The polymerization was initiated by adding 125 mg of ammonium peroxodisulfate (NH$_4$)$_2$S$_2$O$_8$ (APS) and 2500 mg of disuccinic acid peroxide (DSAP) in water solution. As the reaction started, the reaction pressure of 20 bar was maintained by feeding TFE into the gas phase. The reaction temperature was increased until 80° C. with a rate of 0.36° C./min, then additional 80 g of above mentioned cyclic surfactant in water solution were added until the 25% of monomer conversion was reached. At 90% of conversion, 2200 mg of DSAP and 25 g of HFP were further added. Monomer addition was then stopped and the stirring interrupted. The reactor was depressurized, vented and cooled.

A polymer dispersion was thus obtained, having a solid content of 31% w/w.

The dispersion was diluted to 15% solids with demineralized water and after adding 0.1% (based on the weight of dispersion) of ammonium carbonate was agitated vigorously until coagulation completed, and stirred for additional 5 minutes. The coagulated product was dried at 150° C. The product so recovered was submitted to analytical determinations; comonomer content by IR analysis, amorphous index and rheometer extrusion pressure at reduction ratio 1600:1 were measured. Similar procedure was repeated for runs 1 to 6, as summarized in Table 1, using variable amounts of initially introduced HFP; results are summarized in the Table, together with comparative data obtained in runs 7C to 9C, carried our following similar procedure, but using ammonium perfluorooctanoate as surfactant instead of the cyclic surfactant mentioned above.

TABLE 1

| Run | Amount of HFP initially introduced (*) (g) | HFP (% mol) | A.I. | Rheometric Pressure (MPa) |
|---|---|---|---|---|
| 1 | 40 | 1.55E−01 | 0.194 | 70 |
| 2 | 33.8 | 1.44E−01 | 0.155 | — |
| 3 | 20.5 | 9.81E−02 | 0.166 | 52.6 |
| 4 | 17.5 | 7.59E−02 | 0.173 | 58.5 |
| 5 | 14.7 | 8.33E−02 | 0.114 | 57.4 |
| 6 | 10.3 | 6.67E−02 | 0.128 | 45.1 |
| 7C | 42.5 | 1.89E−01 | 0.101 | 45.9 |
| 8C | 33.8 | 1.51E−01 | 0.097 | 43.1 |
| 9C | 40 | 1.65E−01 | 0.104 | 44.3 |

(*) An additional amount of HFP equal to 25 g was added in each run.

FIG. 1 is a plot of amorphous index values, as determined by IR spectrometry, as a function of molar concentration of monomer (F), for TFE copolymers of examples 1 to 6 (black solid squares ♦) obtained by emulsion polymerization in the presence of surfactant (FS) and for comparative TFE copolymers with hexafluoropropylene (white circles a) obtained by emulsion polymerization in the presence of ammonium perfluorooctanoate in examples 7C to 9C and similar polymerization runs.

The invention claimed is:

1. A process for the manufacture of a tetrafluoroethylene (TFE) copolymer [polymer (F)] consisting essentially of recurring units derived from TFE, and from 0.05 to 0.175% by moles, with respect to the total moles, of recurring units derived from hexafluoropropylene [monomer(F)], said process comprising emulsion polymerizing TFE and said at least one monomer (F) in an aqueous medium comprising at least one surfactant [surfactant (FS)] complying with formula (IB):

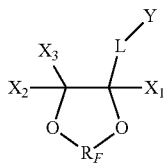
(IB)

wherein:
$X_1$, $X_2$ and $X_3$, equal to or different from each other, are independently selected from H, F and $C_1$-$C_6$ (per)fluoroalkyl groups, optionally comprising one or more catenary or non-catenary oxygen atoms,
$R_F$ represents a divalent perfluorinated $C_1$-$C_3$ bridging group,
L represents a bond or a divalent group, and
Y represents an anionic functionality,
wherein the following inequality is satisfied in polymer (F):

A.I.>0.0083+0.8333×[M]

wherein:
A.I. is the Amorphous Index, defined as the ratio between intensity of the waveband centered at about 778 cm$^{-1}$ and intensity of the waveband centered at about 2367 cm$^{-1}$, as determined by infrared spectroscopy on a specimen of the TFE copolymer,
[M] is the % moles of recurring units derived from said monomer (F).

2. The process of claim 1, wherein said surfactant (FS) complies with formula (IIIB):

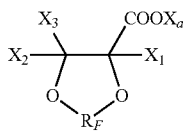
(IIIB)

wherein:
$X_1$, $X_2$ and $X_3$, equal to or different from each other, are independently selected from H, F and $C_1$-$C_6$ (per)fluoroalkyl groups, optionally comprising one or more catenary or non-catenary oxygen atoms;
$R_F$ represents a divalent perfluorinated $C_1$-$C_3$ bridging group; and
$X_a$ is a hydrogen atom, a monovalent metal, or an ammonium group of formula —N(R'$_n$)$_4$, wherein R'$_n$, equal or different at each occurrence, is a hydrogen atom or a $C_1$-$C_6$ hydrocarbon group.

3. The process of claim 2, wherein said surfactant (FS) is selected from the group consisting of formulae (VB-a) to (VB-d), and mixtures thereof:

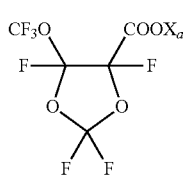
(VB-a)

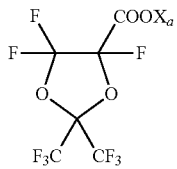
(VB-b)

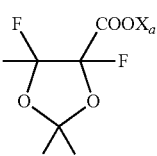
(VB-c)

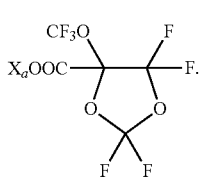
(VB-d)

4. The process of claim 1, wherein said surfactant (FS) complies with formula (VIIIB):

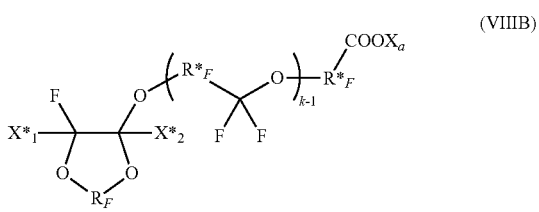
(VIIIB)

wherein:
$R_F$ represents a divalent perfluorinated $C_1$-$C_3$ bridging group;
$X_a$ is a hydrogen atom, a monovalent metal, or an ammonium group of formula —N(R'$_n$)$_4$, wherein R'$_n$, equal or different at each occurrence, is a hydrogen atom or a $C_1$-$C_6$ hydrocarbon group;
$X^*_1$ and $X^*_2$, equal to or different from each other, are independently a fluorine atom, a —R'$_f$ group or a —OR'$_f$ group, wherein R'$_f$ is a $C_1$-$C_3$ perfluoroalkyl group;
$R^*_F$ is a divalent fluorinated group; and
k is an integer from 1 to 3.

5. The process of claim 4, wherein said surfactant (FS) complies with formula (IXB):

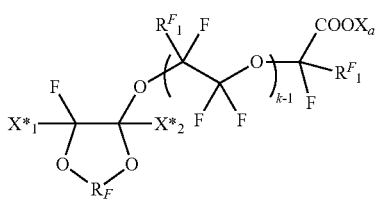
(IXB)

wherein:
$R_F$ represents a divalent perfluorinated $C_1$-$C_3$ bridging group;

$X_a$ is a hydrogen atom, a monovalent metal, or an ammonium group of formula —N(R'$_n$)$_4$, wherein R'$_n$, equal or different at each occurrence, is a hydrogen atom or a $C_1$-$C_6$ hydrocarbon group;

X*$_1$ and X*$_2$, equal to or different from each other, are independently a fluorine atom, a —R'$_f$ group or a —OR'$_f$ group, wherein R'$_f$ is a $C_1$-$C_3$ perfluoroalkyl group;

R$^F_1$ is a fluorine atom or a —CF$_3$ group; and k is an integer from 1 to 3.

6. The process of claim 5, wherein said surfactant (FS) is selected from the group consisting of formulae (XB) to (XIB), and mixtures thereof:

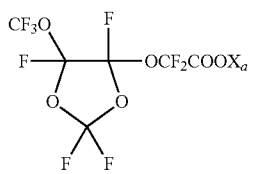 (XB)

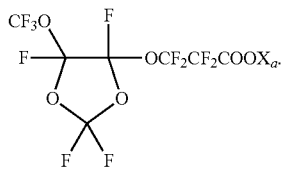 (XIB)

7. The process according to claim 1, wherein the emulsion polymerizing occurs at a temperature comprised between 10 to 150° C. and/or a pressure comprised between 2 and 30 bar.

8. A shaped article comprising the polymer (F) obtained from the process of claim 1.

9. The method of claim 1, wherein the anionic functionality is selected from the group consisting of:

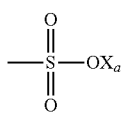 (1')

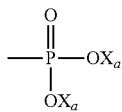 (2')

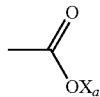 (3')

wherein $X_a$ is a hydrogen atom, a monovalent metal or an ammonium group of formula —N(R'$_n$)$_4$, wherein R'$_n$, equal or different at each occurrence, is a hydrogen atom or a $C_1$-$C_6$ hydrocarbon group.

10. The process according to claim 7, wherein the emulsion polymerizing occurs at a temperature comprised between 20° C. to 110° C. and/or a pressure comprised between 5 to 20 bar.

11. A tetrafluoroethylene (TFE) copolymer consisting essentially of recurring units derived from TFE and from 0.05 to 0.175% by moles, with respect to the total moles, of recurring units derived from hexafluoropropylene [monomer (F)], wherein the following inequality is satisfied:

$$A.I. > 0.0083 + 0.8333 \times [M]$$

wherein:

A.I. is the Amorphous Index, defined as the ratio between intensity of the waveband centered at about 778 cm$^{-1}$ and intensity of the waveband centered at about 2367 cm$^{-1}$, as determined by infrared spectroscopy on a specimen of the TFE copolymer,

[M] is the % moles of recurring units derived from said monomer (F).

12. The polymer (F) of claim 11, wherein said polymer (F) comprises recurring units derived from monomer (F) in an amount of at least 0.01% by moles and/or in an amount of at most 0.200% by moles, with respect to the total moles of recurring units.

13. The polymer (F) of claim 11, wherein said polymer (F) consists essentially of recurring units derived from TFE and from monomer (F).

14. The polymer (F) of claim 11, wherein said monomer (F) is hexafluoropropylene.

15. A shaped article comprising the polymer (F) according to claim 11.

16. The polymer (F) of claim 12, wherein said polymer (F) comprises recurring units derived from monomer (F) in an amount of at least 0.05% by moles and/or in an amount of at most 0.175% by moles, with respect to the total moles of recurring units.

* * * * *